(12) United States Patent
Storm

(10) Patent No.: US 7,307,387 B2
(45) Date of Patent: Dec. 11, 2007

(54) SWITCHABLE VOLTAGE CONVERTER

(75) Inventor: Arwed Storm, Berlin (DE)

(73) Assignee: Patent-Treuhand-Gesellschaft für elektrische Glühlampen mbH, Munich (DE)

( * ) Notice: Subject to any disclaimer, the term of this patent is extended or adjusted under 35 U.S.C. 154(b) by 110 days.

(21) Appl. No.: 11/399,491

(22) Filed: Apr. 7, 2006

(65) Prior Publication Data
US 2006/0226817 A1 Oct. 12, 2006

(30) Foreign Application Priority Data
Apr. 7, 2005 (DE) ............ 10 2005 016 047

(51) Int. Cl.
H05B 37/02 (2006.01)

(52) U.S. Cl. ............ 315/247; 315/224; 323/225

(58) Field of Classification Search ........ 315/246, 315/247, 209 R, 224, 225, 291, 307; 323/207–209, 323/225, 229, 232, 233
See application file for complete search history.

(56) References Cited

U.S. PATENT DOCUMENTS

| | | | | |
|---|---|---|---|---|
| 5,907,223 A | * | 5/1999 | Gu et al. | 315/247 |
| 6,683,418 B2 | * | 1/2004 | Shoji et al. | 315/224 |
| 7,078,868 B2 | * | 7/2006 | Samejima et al. | 315/219 |
| 7,196,479 B2 | * | 3/2007 | Storm | 315/209 R |
| 2006/0049770 A1 | * | 3/2006 | Van Casteren | 315/209 R |

FOREIGN PATENT DOCUMENTS

WO  WO 02/41480  11/2001

* cited by examiner

Primary Examiner—Douglas W. Owens
Assistant Examiner—Jimmy Vu
(74) Attorney, Agent, or Firm—Carlo S. Bessone

(57) ABSTRACT

A voltage converter, whose topology can be switched over between a boost converter and a SEPIC. The boost converter has ripple current compensation. As a result, the inductors used can be utilized in optimum fashion. A thyristor which is protected against breakdown triggering by a negative gate voltage is used as the changeover switch.

12 Claims, 1 Drawing Sheet

SWITCHABLE VOLTAGE CONVERTER

FIELD OF THE INVENTION

The invention relates to a switchable voltage converter which can be used in pulsed power supplies. The invention also relates to an operating device for operating lamps using a voltage converter according to the invention.

BACKGROUND OF THE INVENTION

The topologies of boost converter and SEPIC (single-ended primary inductance converter) are generally known in pulsed power supplies. In particular in the case of two-stage operating devices for discharge lamps, these types of converter are widely used in the first stage. The first stage provides power factor correction and makes available an intermediate circuit voltage, while a second stage generally produces a high-frequency AC voltage to be supplied to the discharge lamp. An electronic switch, which switches at a high frequency compared to a system frequency, provides the clock pulse in the two pulsed power supplies.

The document WO 02/41480 (Chang) discusses the respective advantages and disadvantages of the two types of converter. The essential advantage of the boost converter is a high efficiency, while a disadvantage is the fact that the lower limit of the output voltage is the peak value of the input voltage. The properties of the SEPIC are the opposite: the advantageous feature is the fact that its output voltage can be selected independently of the input voltage, while its efficiency is markedly lower than in the case of the boost converter.

The document WO 02/41480 (Chang) then describes a voltage converter having a switchable topology. Depending on the position of a changeover switch, the disclosed voltage converter either functions as a boost converter in a boost mode or as a SEPIC in a SEPIC mode.

The voltage converter disclosed in the document WO 02/41480 (Chang) has the following disadvantages:

A changeover switch with three poles is required to switch over between the topologies. Although this can be implemented using mechanical switches, an implementation with semiconductor switches is complex since two switches are required. In addition, these two switches need to be synchronized.

The known SEPIC topology requires two inductors, while the conventional topology of the boost converter only requires one inductor. A further disadvantage of the voltage converter described in WO 02/41480 (Chang) consists in the fact that, in the boost mode, an inductor, which is required for the SEPIC, is disconnected. The redundant SEPIC inductor has no function in the boost mode. This has the result that the inductor which is active both in the SEPIC mode and in the boost mode is subjected to a different load in the two modes with the same power output at the output of the voltage converter. This inductor needs to be dimensioned such that the maximum amount of energy which can be stored by this inductor in the boost mode is not exceeded. For the SEPIC mode, this inductor is overdimensioned. This results in the switchable voltage converter being more expensive than the unswitchable converter, in whose mode it is functioning at present. This is not only due to the switches for switching over between the modes, but is also due to the fact that, in the boost mode, the SEPIC inductor is disconnected and is without use and, in the SEPIC mode, the inductor facing the input is overdimensioned.

SUMMARY OF THE INVENTION

One object of the present invention is to provide a switchable voltage converter which has reduced costs compared to the prior art. According to the invention, this is achieved by a switchable voltage converter which requires only a single switch for switching over between the modes. Furthermore, the object of the present invention is achieved by the fact that the boost converter, in the boost mode, has a topology which corresponds to the topology of a so-called boost converter with ripple current compensation. This is described, for example, in the following literature: Jing Wang; Dunford, W. G.; Mauch, K.: "Analysis of a ripple-free input-current boost converter with discontinuous conduction characteristics", IEEE Transactions on Power Electronics, Vol. 12, Iss. 4, July 1997, pp 684-694. FIG. 2 of this literature reference shows the topology of the boost converter with ripple current compensation.

In the case of ripple current compensation, the series circuit comprising a second inductor and a capacitor is connected in parallel with the electronic switch of the boost converter. High-frequency current (ripple current) flows largely in the second inductor, while only little high-frequency current, in comparison to the second inductor, flows in a first inductor, which is coupled to the input of the voltage converter, as a result of which radio interference is reduced. Complete compensation of the high-frequency current in the first inductor is possible owing to a magnetic coupling between the first inductor and the second inductor. The two inductors can be dimensioned such that each inductor only needs to have half the maximum energy storage capacity of the single inductor in a boost converter without ripple current compensation. The additional complexity for inductors is thus low in the case of a boost converter having ripple current compensation compared to the boost converter without ripple current compensation.

According to the invention, a second diode is connected to the output of the voltage converter from the connection point of the abovementioned series circuit comprising the second inductor and the capacitor. This diode is always polarized in the reverse direction in the booster mode and is thus out of operation. A mode switch is connected in series with a first diode, which represents the known booster diode. If the mode switch is closed, the voltage converter is functioning in the booster mode. If the mode switch is open, the first diode is out of operation and the voltage converter operates in the SEPIC mode with the aid of the second diode. In this case, the first inductor and the second inductor are used from a magnetic point of view in precisely the same way as in the boost mode. The inductors can thus be optimized for one mode and are thus equally optimized for the other mode as well.

Only a single switch is required to disconnect the booster diode. In the two modes, in each case only one diode is out of operation, and the two inductors are used in optimum fashion in both modes. The complexity of the switched voltage converter compared to the prior art is therefore considerably reduced and is even only slightly greater than the complexity for the unswitched separate converters.

One further aspect of the present invention relates to the implementation of the mode switch. It is advantageously provided with a thyristor which is triggered by a drive circuit which suppresses breakdown triggering of the thyristor. This takes place by a negative voltage being applied to the gate of the thyristor for as long as it should not be triggered, the negative voltage being obtained from an auxiliary inductor which is magnetically coupled to the first inductor.

BRIEF DESCRIPTION OF THE DRAWINGS

The invention will be explained in more detail below using exemplary embodiments with reference to drawings, in which.

In the following text, resistors are denoted by the letter R, switches by the letter S, diodes by the letter D, capacitors by the letter C, nodes by the letter N, connections by the letter J and inductors by the letter L, in each case followed by a number. The same references will also be used throughout below for identical and functionally identical elements of the various exemplary embodiments.

DETAILED DESCRIPTION OF THE INVENTION

Figure 1:
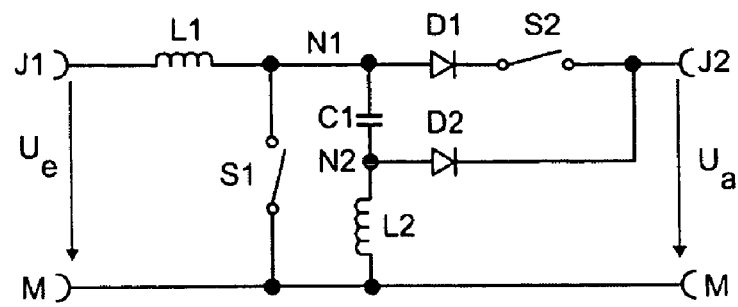
FIG. 1 shows an exemplary embodiment of a switchable voltage converter according to the invention.

FIG. 1 shows one exemplary embodiment of a switchable voltage converter according to the invention. A series circuit comprising a first inductor L1 and an electronic switch S1 is connected between an input terminal J1 and a reference potential M, a first node N1 being formed at the connection point. The voltage converter can be fed by an energy source, which produces an input voltage Ue at J1, between the input terminal J1 and the reference potential M. The energy source is generally a rectified system voltage. If appropriate, a filter is also interposed for the purpose of reducing radio interference or to counteract overvoltage.

A series circuit comprising a first capacitor C1 and a second inductor L2 is connected in parallel with the electronic switch S1, a second node N2 being formed at the connection point between the first capacitor C1 and the second inductor L2. This series circuit implements the abovementioned ripple current compensation. In order to improve compensation, L1 and L2 may be magnetically coupled. Values are preferably selected for the inductance of L1 and L2 which depend on the magnetic coupling k in accordance with the following equation:

$$k = \sqrt{\frac{L2}{L1}},$$

where L1 should be greater than or equal to L2.

A series circuit comprising a first diode D1 and a mode switch S2 is connected between the first node N1 and an output terminal J2, the first diode D1 being polarized such that it allows a current to flow from the first node N1 to the output terminal J2. An output voltage Ua is present between J2 and the reference potential. This output voltage Ua is generally buffer-stored by a storage capacitor, from which energy is drawn by a load. An intermediate circuit voltage is present at the storage capacitor. An inverter, which is connected downstream of the voltage converter, can produce a high-frequency AC voltage from the intermediate circuit voltage, and this high-frequency AC voltage is used to operate a discharge lamp.

When the mode switch is closed, the voltage converter functions as a boost converter. This is advantageous when a higher voltage is required at J2 than is present at J1.

A second diode D2 is connected with its anode to the second node N2 and with its cathode to the output terminal J2. The voltage converter can thus function as a SEPIC if S2 is open. This is advantageous when a lower voltage is required at J2 than is present at J1.

The mode switch S2 can be controlled by a control device.

The control device causes the mode switch S2 to be opened if the voltage at the input terminal J1 exceeds a given limit voltage value.

During operation of discharge lamps, the mode switch can also be controlled as a function of the voltage which is required at the output J2 by a lamp to be operated. If a lamp requires a voltage which is high compared to the voltage at the input terminal J1, the mode switch is closed and the voltage converter functions in the boost mode. At comparatively low voltages, the mode switch is opened and the voltage converter functions in the SEPIC mode.

Figure 2:
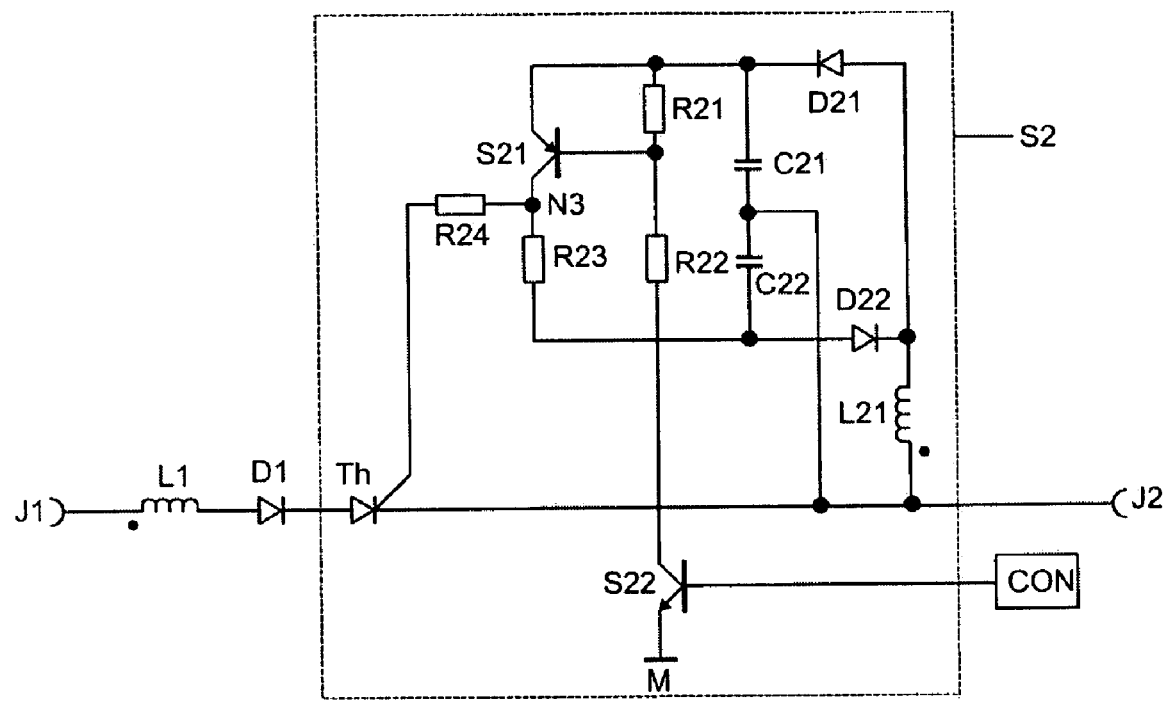
FIG. 2 shows an exemplary embodiment of a mode switch for a switchable voltage converter according to the invention.

FIG. 2 illustrates an exemplary embodiment of a mode switch S2 for a switchable voltage converter according to the invention. The switching element of the mode switch S2 is a thyristor Th, which is triggered by a drive circuit by means of a control switch S22. When a thyristor is used, it is necessary to take care that it is not triggered by known, undesirable breakdown triggering. Whenever the electronic switch S1 opens, the voltage at the anode of the thyristor increases rapidly, and there is a risk of breakdown triggering. The risk is particularly high when a voltage converter according to the invention is first used. A storage capacitor at the output of the voltage converter is still discharged when the voltage converter is first operated, as a result of which the output voltage Ua is zero. This results in a high instantaneous voltage between the anode and the cathode of the thyristor and a risk of breakdown triggering.

In order to prevent this, the drive circuit always applies a negative voltage to the gate of the thyristor Th with respect to the cathode of the thyristor Th if the control switch S22 is open, i.e. no triggering is desired.

This is achieved, as shown in FIG. 2, by an auxiliary inductor L21 which is DC-coupled with its first connection to the cathode of the thyristor Th, the auxiliary inductor L21 being magnetically coupled to the first inductor L1 such that a negative protective voltage with respect to its first connection is present at its second connection if a negative voltage with respect to the input terminal J1 is present at the first inductor L1.

The negative protective voltage charges a capacitor C22 via a diode D22. The voltage at C22 is connected between the gate and cathode of the thyristor via a series circuit comprising the resistors R23 and R24. The node N3 is formed between R23 and R24.

A positive voltage at the auxiliary inductor charges a capacitor C21 via a diode D21. The voltage at C21 is connected between the gate and the cathode of the thyristor via an auxiliary switch S21, the node N3 and R24. As long as S21 is open, a negative voltage is thus present at the gate, as a result of which breakdown triggering is avoided. As soon as S21 closes, the thyristor Th is triggered by the positive voltage at C21.

In the exemplary embodiment shown in FIG. 2, the auxiliary switch S21 is formed by a PNP bipolar transistor, which is coupled with the emitter to C21 and with the collector to the node N3. A resistor R21 is connected between the base and the emitter. The control switch S22 is an NPN bipolar transistor which is connected with its emitter to the reference potential M. The collector of S22 is connected to the base of S21 via a resistor R22. The base of S22 is connected to a control device CON, which controls the mode switch S2.

As long as the control device CON does not output a signal, S22 is open, as a result of which S21 is also open and a negative voltage is present at the gate of the thyristor. The voltage converter functions in the SEPIC mode.

If the control device CON turns the control switch S22 on, S21 is also turned on and the thyristor is triggered. The voltage converter then functions in the boost mode.

The circuit arrangement comprising R21, R22, R23, R24, S22 and S21 is known from the literature as a bootstrap circuit. This circuit is used if a switch, whose drive signal is not related to ground (as in the present case the gate of the thyristor), is intended to be switched by a signal, which is related to ground, from a control device. This signal, which is related to ground, in the present case comes from the control device CON. The bootstrap circuit in FIG. 2 is to be understood merely as an example. In the same way, other bootstrap circuits conventional to those skilled in the art can also be used. For example, the bootstrap circuit may comprise field-effect transistors, or the potential difference, which is bridged in the example by S22, can be bridged by a transformer.

The provision of a positive voltage and a negative voltage at C21 and C22 is critical. The bootstrap circuit, which connects either the positive voltage or the negative voltage to the gate of the thyristor depending on the control device CON, is desirable.

The invention claimed is:

1. A voltage converter having the following features:
an input terminal (J1) and an output terminal (J2),
a reference potential (M),
a series circuit comprising a first inductor (L1) and an electronic switch (S1) between the input terminal (J1) and the reference potential (M), a first node (N1) being formed at the connection point,
a series circuit comprising a first capacitor (C1) and a second inductor (L2) is connected in parallel with the electronic switch (S1), a second node (N2) being formed at the connection point between the first capacitor (C1) and the second inductor (L2),
a series circuit comprising a first diode (D1) and a mode switch (S2) is connected between the first node (N1) and the output terminal (J2), the first diode (D1) having such a polarity that it allows a current to flow from the first node (N1) to the output terminal (J2),
a second diode (D2) is connected with its anode to the second node (N2) and with its cathode to the output terminal (J2).

2. The voltage converter as claimed in claim 1, characterized by a control device (CON) for the purpose of controlling the mode switch (S2), the control device causing the mode switch (S2) to open if the voltage at the input terminal (J1) exceeds a given limit voltage value.

3. An operating device for operating discharge lamps having a voltage converter as claimed in claim 2, characterized by a control device (CON) which causes the mode switch (S2) to open if a discharge lamp to be operated requires an intermediate circuit voltage at the output terminal (J2) which is below a predetermined value.

4. An operating device for operating discharge lamps having a voltage converter as claimed in claim 1, characterized by a control device (CON) which causes the mode switch (S2) to open if a discharge lamp to be operated requires an intermediate circuit voltage at the output terminal (J2) which is below a predetermined value.

5. The voltage converter as claimed in claim 1, characterized in that the first inductor and the second inductor are dimensioned such that the maximum value of the energy stored during operation of the voltage converter in the two inductors is approximately the same, this being independent of the position of the mode switch.

6. The voltage converter as claimed in claim 5, characterized in that the first inductor and the second inductor have the same inductance.

7. The voltage converter as claimed in claim 6, characterized in that the first inductor and the second inductor are magnetically coupled.

8. The voltage converter as claimed in claim 5, characterized in that the first inductor and the second inductor are magnetically coupled.

9. The voltage converter as claimed in claim 1, characterized in that the mode switch (S2) comprises a thyristor (Th) and a drive circuit having a control switch (S22), the drive circuit bringing about a negative voltage at the gate of the thyristor (Th) with respect to the cathode of the thyristor (Th) if the control switch (S22) is open.

10. The voltage converter as claimed in claim 9, characterized in that the drive circuit comprises an auxiliary inductor (L21) which is DC-coupled with its first connection to the cathode of the thyristor (Th), the auxiliary inductor (L21) being magnetically coupled to the first inductor (L1) such that a negative protective voltage with respect to its first connection is present at its second connection if a negative voltage with respect to the input terminal (J1) is present at the first inductor (L1).

11. The voltage converter as claimed in claim 10, characterized in that the control switch has a control input which evaluates a voltage with respect to the reference potential (M), in which case closing of the control switch causes an auxiliary switch (S21) to close, as a result of which a trigger voltage is applied between the gate and the cathode of the thyristor (Th).

12. The voltage converter as claimed in claim 11, characterized in that the auxiliary inductor (L21) charges in each case one auxiliary capacitor (C21, C22) to the trigger voltage or the protective voltage via in each case one diode (D21, D22).

* * * * *